United States Patent [19]

Orndorff, Jr.

[11] 3,993,371
[45] Nov. 23, 1976

[54] THIN RUBBER SURFACED BEARINGS

[75] Inventor: Roy L. Orndorff, Jr., Kent, Ohio

[73] Assignee: The B. F. Goodrich Company, Akron, Ohio

[22] Filed: July 22, 1974

[21] Appl. No.: 490,228

[52] U.S. Cl. .............................. 308/238; 308/73; 308/121; 308/160; 308/239
[51] Int. Cl.² ................ F16C 17/02; F16C 17/14; F16C 22/06; F16C 33/22
[58] Field of Search .......... 29/149.5 NM; 308/73, 308/160, 238, 121, 239

[56] References Cited
UNITED STATES PATENTS

| | | | |
|---|---|---|---|
| 1,895,936 | 1/1933 | Merrill | 308/238 |
| 2,215,523 | 9/1940 | Haushalter | 308/238 |
| 2,227,969 | 1/1941 | Haushalter | 29/149.5 NM |
| 2,339,645 | 1/1944 | MacGill | 308/238 |
| 3,407,779 | 10/1968 | Satterthwaite et al. | 308/238 X |
| 3,561,830 | 2/1971 | Orndorff, Jr. | 308/238 |

Primary Examiner—Robert G. Sheridan
Assistant Examiner—Howard Beltran
Attorney, Agent, or Firm—W. A. Shira, Jr.; H. S. Meyer

[57] ABSTRACT

An improved water-lubricated bearing consists of longitudinal strips of rubber bonded to a rigid backing. The strips are either flat or have a concave surface of less curvature than the journal, and are so thin that the width of each strip is at least 6 and preferably 10 or more times its thickness. The backing may be polyethylene bonded to the rubber during vulcanization.

22 Claims, 16 Drawing Figures

MINIMUM 1.5MM

THIN RUBBER SURFACED BEARINGS

BACKGROUND

Journal bearings, especially those used underwater as in deep well pump shafts or in the outboard bearings of propeller shafts in ships, have been made for many years with a rubber surface divided by longitudinal grooves or spaces, since it has been found that smooth rubber lubricated with water has a very low coefficient of friction under the proper operating conditions so that no special provision for supply of lubricant is required. Such bearings have sometimes given excellent service for prolonged periods with almost no wear, but in other instances, not easily distinguishable, have been less satisfactory and have exhibited rapid and sometimes erratic wear. In some instances with limited power, the water has been squeezed out of the bearing when the shaft is stationary so that the extremely high coefficient of friction of dry rubber has actually prevented starting of rotation.

SUMMARY OF THE INVENTION

I have discovered, paradoxically, that previous difficulties in use of rubber bearings are easily overcome and greatly improved service is obtained by reducing the thickness of the rubber bearing material between its external support and the rotating shaft or journal. It seems always to have been taken for granted that, since the distinguishing feature of rubber bearings is the resiliency of the rubber, when probblems are encountered they could be minimized by increase of thickness and therefore resiliency of the rubber layer. The contrary has now been found to be the fact.

Although the surface speeds of journals operating underwater have frequently been in a range considered to be too low for true hydrodynamic lubrication with a lubricant having as low a viscosity as water, I have found that this limitation is of far less consequence with the bearings of this invention, which exhibit hydrodynamic lubrication and phenomenally low coefficients of friction, together with absence of noise, even at quite low speeds.

To achieve the full benefit of this invention, the thickness of the rubber must be between two limiting values. The lower limit is imposed by the dimensions of sand and grit particles which can be carried in suspension by the water in which the bearings are normally operated. The upper limit is imposed by the geometry of the bearing construction, including the need to provide for a very small angle of approach of the rubber bearing surface to the surface of the rotating journal for achieving hydrodynamic lubrication, which in turn means limiting the extent of sinkage of the journal into the soft rubber material.

Since the lower limit is related to the size of suspended grit, it should be noted that one of the principal reasons for the superb performance of properly designed and fitted rubber bearings, in addition to the low coefficient of friction, is that suspended grit particles, which may be naturally present in the water in which the bearings operate or which may be stirred up by the propeller or other rotating mechanism, do not damage properly designed rubber bearings.

Such grit particles as enter bearings have always tended to become embedded in nonresilient bearing materials, such as babbitt metal or even brass and particularly in softer materials such as lignum vitae or nonresilient plastics. Grit particles, when so embedded, score the journal and if present in sufficient number cause rapid wear and reduction in diameter. On the contrary, grit particles entering between a rotating journal and a resilient rubber bearing are simply depressed into the resilient surface and rolled across the face of the bearing into the next groove where the water washes the particle away without its having caused any damage. This action requires the rubber thickness to be a multiple of the dimension of the largest grip particle likely to be encountered. Experience shows that grit particles which enter bearings will not ordinarily have diameters in excess of a small fraction of a millimeter (about 1/100 inch) since larger particles of mineral matter will ordinarily settle so rapidly as not to be likely to enter bearings where they could cause damage.

Consequently, for service in deep water, such as the open seas and deep harbors where only very fine suspended particles are encountered, the minimum dimension can be less than in the case of shallow streams or shallow harbors with sandy bottoms. Accordingly, the mimimum rubber thickness is considered to be about 2.5 to 1.5 millimeters (1/10 to 1/16 inch) depending on water condition.

The maximum thickness of rubber for obtaining the benefits of this invention is to some extent dependent on the radial load, which in turn is in general related to the diameter of the shaft. Thus in use of the bearings for propeller shafts of increasing diameter, if dimensions are simply scaled up in proportion, the supporting area increases in proportion to the square of the linear dimensions, whereas the weight increases in proportion to the cube of linear dimensions. In addition, other factors, including convenience of manufacture and installation, may dictate different choices of geometrical relationships depending somewhat on size.

As already mentioned, rubber bearings are ordinarily provided with longitudinal water supply grooves, which means that the bearing surface is composed of a number of parallel longitudinal strips. It is ordinarily not convenient to employ fewer than eight strips for most satisfactory support of the rotating journal, even in small sizes, although as few as four or even three can be used. For larger sizes, where separate fabrication of the individual strips is more conveninet than the supply of a unitary or integral bearing, size and weight considerations dictate increasing the number of strips in order to minimize handling problems in assembly and maintenance, so that twenty or more strips may be found convenient for very large journals up to one meter or more (39 inches) in diameter. The permissible thickness of rubber then becomes a function of journal diameter and number of bearing strips, which means the effective width of each strip, as well as radial load per unit of length of the bearing, and stiffness or load-supporting ability of the rubber.

While bearings made of other materials are ordinarily curved to fit the cylindrical surface of the rotating journal, that has not usually been the case with rubber bearings, because the resilience of the rubber permits the journal to sink into the rubber to an extent determined by the radial load and displace some of the rubber in the circumferential direction of the journal.

As is well known, minimum resistance to rotation is ordinarily obtained only with hydrodynamic lubrication, which means that the operation of the bearing must assure continuous presence of a film of liquid lubricant of sufficient thickness to prevent any direct contact of the journal with the bearing. In the case of simple bearings, such a supporting film of lubricant can be produced only by the relative motion between the journal and the bearing, drawing lubricant fluid into the space between the journal and the bearing. This ordinarily occurs only if the surface of the journal and the surface of the bearing are at a very small angle one to another at the front edge of the journal-supporting area of the bearing. This angle is generally called the angle of approach. To rotation of the journal then drags with it some of the lubricant, which, as it is wedged into the narrow space at the apex of the angle of approach, passes between the opposing surfaces of the journal and the bearing to an extent depending on the speed of rotation or, more accurately, the linear circumferential speed of the surface of the journal. Opposing this effect is the radial load which tends to squeeze out the film of lubricant which is being used, so that for each particular combination of bearing design and size, and radial load, there is a limiting speed of operation above which hydrodynamic lubrication occurs and below which some lubricant passes through the bearing but some contact of the journal and the bearing also occurs.

It is well known that when a cylinder which is long compared to its diameter, so that end effects are negligible, is pressed against a rubber surface, it sinks into the rubber, displacing the essentially incompressible material in a circumferential direction to form a bulge on either side of the contact area. I have found that if the thickness of the rubber permits, a sufficiently large force will sink the cylinder into the rubber to such an extent that the bulge will make contact with the cylinder at an angle large enough to act as a squeegee and wipe the water off the cylindrical surface at normal journal speeds.

To prevent or minimize squeegee action, the cylindrical journal must not be allowed to sink excessively into the soft rubber bearing. The primary condition for this purpose is that the thickness of the rubber part of the bearing, that is, the thickness subject to direct compression between the journal and the rigid backing, have a definitely limited dimension with respect to its width. This relationship is that the width should not be less than six times thickness, and preferably eight or ten times the thickness of the rubber in the center of the bearing strip, or even more, up to 15 or 20 times thickness. If the number of strips of bearing materials is less than about ten so that a considerable portion of the width of a strip projects beyond the contact area, this relationship applies to the part of the width which might actually come in contact with the journal.

Best results have been obtained when the thickness is not only limited with respect to the width of the bearing strip but also with respect to the diameter of the journal. Thus, in large bearings with 12 or more longitudinal strips of carbon-black reinforced ordinary soft rubber of a hardness of 60 to 90 on the Durometer A scale and a nominal load (force divided by the product of journal diameter and bearing length) in the approximate range of 2 to 7 K/cm$^2$ (30 to 100 lbs/in$^2$) or somewhat more, I prefer that the thickness of rubber in the center of the contact area should be in the range of about one-twentieth to one-fortieth of the journal diameter for journals with a diameter of 25 to 40 cm (10 to 16 in.), 1/13 to 1/16 for journals with a diameter of 40 to 60 cm (16 to 24 in.), and 1/50 to 1/100 for journals with a diameter of 60 to 100 cm (24 to 40 in.) or more. That is, the thickness of rubber is preferably of the order of magnitude represented by the fraction of journal diameter whose denominator is the diameter in centimeters.

For substantially greater loads, the thickness should be still less in inverse proportion to the load so as to minimize the circumferential bulging and therefore increase the load-supporting supporting ability of the rubber bearing material, without producing a squeegee effect.

Although the loads just mentioned are several times those previously considered suitable for rubber bearings, I have found that even greater loads can be supported, ranging up to 60 K/cm$^2$ (900 lbs/in$^2$) or more, by keeping the ratio of journal diameter to rubber thickness sufficiently great, up to 30 or even 40 for a 25 cm (10 in.) diameter journal and using a grade of rubber firm enough so that the line of contact of the journal with the bulge of displaced rubber cannot be at or near the edge of the bearing strip or in any strongly convex portion of the strip, and thus cannot act as a squeegee.

In addition, I have discovered that very favorable conditions occur at surface speeds too low for hydrodynamic lubrication, as at start up or at particularly low speeds of operation of the machinery, if a rather soft grade of rubber is used, in the approximate range of 60 to 75 on the Durometer A scale. It is common experience that the dry coefficient of friction of rubber tends to increase as the rubber becomes softer. I have found that the wet coefficient of friction of rubber of the softness just mentioned is substantially less than that of the firmer grades, at speeds below those resulting in hydrodynamic lubrication, so that smoother operation with less production of heat and noise occurs with bearings made from a thin layer of such a soft grade of rubber.

I believe that the unusually favorable performance of the bearings of this invention at low operating speeds is in part the result of formation of a lubricant pocket by reason of the very small angle of approach which results in a positive feed of water lubricant even at speeds too low for complete hydrodynamic lubrication. Such lubricant escapes at both ends and also at the trailing end of the area of contact, and the fluid pressure obviously is a minimum at the lines of escape. In the interior of the apparent area of contact, there exists a fluid pressure of lubricant of a magnitude dependent on the balance between rate of feed of lubricant at the approach edge, and rate of escape, for the journal load and surface speed then existing. This fluid pressure, greater at the center than at the edges, must distort the surface of the rubber to form a pocket filled with lubricant, which minimizes the area of contact. The formation of such a lubricant pocket is favored by a relatively soft grade of rubber at the bearing surface. Such a pocket cannot form in a rubber bearing with an unfavorable angle of approach, because the squeegee action prevents supply of sufficient lubricant.

DRAWINGS

In the accompanying drawings.

DETAILED DESCRIPTION

The bearings of this invention are made up of longitudinal strips separated by lubricant grooves. The strips have a rigid backing on which is a thin working surface of rubber, or other suitable elastomer, so shaped and dimensioned as to promote as effectively as is reasonably possible the occurrence of hydrodynamic lubrication, without requiring force feed of lubricant under high pressure. To accomplish this result, the bearing material is preferably shaped flat but may be slightly curved in the direction of the journal with an overall curvature less than that of the journal, and is kept thin with relation to the internal diameter of the bearing (i.e., the journal diameter) and also thin with relation to width of each segment or strip. These relationships assure a bearing surface which will approach the surface of the journal at a very small angle.

Specifically, the bearing surface should be essentially free from convexity. That is, the surface should either be cylindrically concave with a radius significantly greater than that of the journal, or flat (infinite radius of curvature).

In addition, the thickness of the rubber bearing material from the rigid supporting backing to the working surface should not be over one-sixth of its width (i.e., the width of each strip is not less than about six times its effective thickness). Moreover, the thickness of the rubber, especially in large diameter bearings, should not be more than 5% and preferably not more than 2% of the bearing diameter (i.e., journal diameter).

Figures 1, 2, 3:
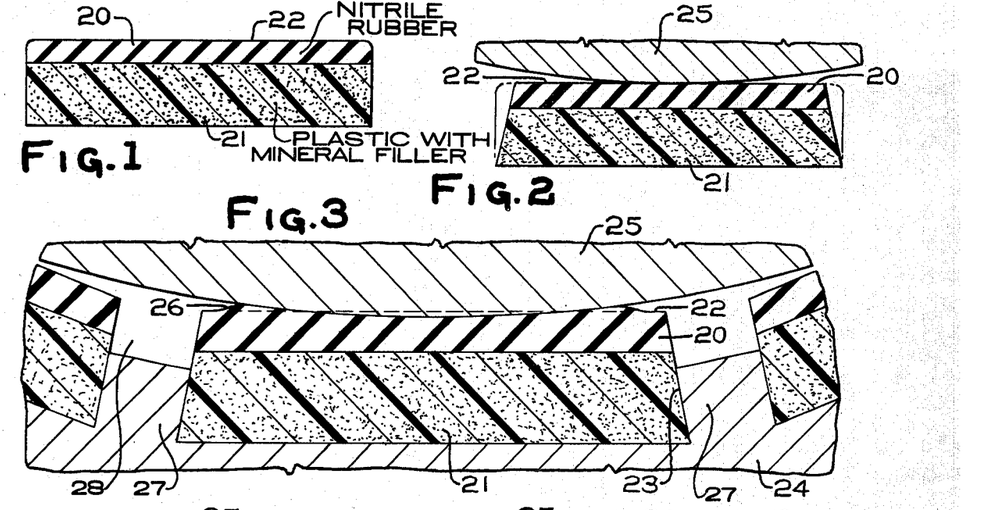
FIG. 1 is a diagrammatic transverse section of a single bearing strip according to this invention.
FIG. 2 is a similar section of the same strip after trimming the edges to fit a dovetail groove in a supporting sleeve, and shows its relation to a journal under no-load conditions.
FIG. 3 is a similar section on a larger scale showing the same bearing strip as a part of an actual bearing under maximum load conditions.

Referring to FIGS. 1 and 2, a thin layer of rubber 20 of medium softness, such as 65 to 80 Durometer A scale, with a width about 12 times its thickness, is vulcanized to a rigid backing 21. The backing may be metal, such as brass, but is preferably a hard plastic because of its cheapness, ease of fabrication, and elimination of corrosion problems. For example, an ultra-high molecular weight polyethylene is a suitable and preferred backing material because of its low cost and combination of strength with ease of fabrication. Such bearings can be fabricated either by molding to an exact finished shape or by molding to approximate shapes which are then machined to an exact shape to fit a particular bearing structure.

Thus the bearing strip of FIG. 1 is shown in FIG. 2 with the edges machined to fit into a dovetail slot and with a showing of the relation of its working surface 22 to the curvature of a journal 25 under no-load conditions.

FIG. 3 shows the same bearing strip and journal on an enlarged scale, as they would appear with the backing 21 in a dovetail groove 23 of a supporting shell 24, with the journal 25 under maximum load conditions sinking into the center of the bearing strip and displacing rubber to form a slight bulge 26 at either edge of the contact area of the working surface 22 but with retention of a very small angle of approach to promote hydrodynamic lubrication even at moderate surface speeds. The backing 24 between adjacent dovetail grooves 23 functions as a spacer 27 extending only part of the distance inward toward the working surface 22 of the rubber strips, leaving a groove which functions as a lubricant passage 28.

Figure 4:
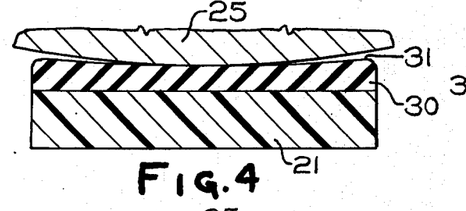
FIG. 4 is a section of a similar bearing strip in which the upper or working surface of the bearing, instead of being flat, is transversely curved with a radius substantially greater than that of the journal.

FIG. 4 resembles FIG. 2 in showing a bearing strip in its relation to a journal 25 under no-load conditions with a thin surface layer of rubber 30 bonded to a rigid backing 21, but in this case with the working surface 31 having a cylindrical curvature with a radius of about twice that of the journal intended for operation with it.

Figure 5:
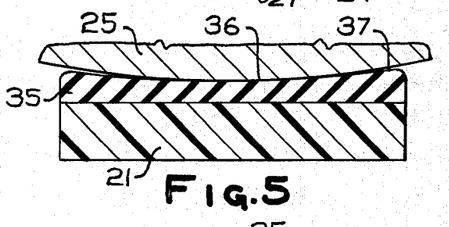
FIG. 5 is a section of another bearing strip with the center of the strip having a curvature similar to that of the journal and with the edges flat and tangential to the curve of the center.

FIG. 5 shows a similar bearing strip with its rubber surface layer 35 having a curved working surface except that approximately the middle one-third 36 of its width has a curvature approximating that of the journal, with the other two-thirds on either side being flat surfaces 37 tangential to the curved middle portion.

Figure 6:
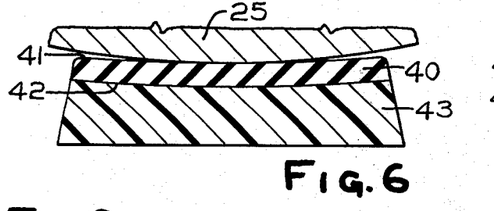
FIG. 6 is a section of a still different bearing strip with both the upper and lower surfaces of the rubber similarly curved, so that the rubber is of uniform thickness.

FIG. 6 shows a form of the invention in which the rubber surface layer 40 has a curvature of the working surface 41, like that of FIG. 4, with a radius of about twice that of the journal. It differs from the bearing of FIG. 4 in that the rubber does not become thicker at the edges but is of approximately uniform thickness from one edge to the other; that is, the front or working surface 41 of the rubber and the back surface 42 where the rubber is bonded to the rigid backing 43 have about the same curvature.

Figure 7:
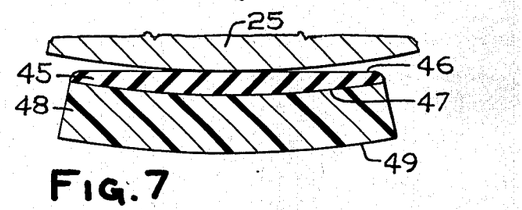
FIG. 7 is a section of a bearing strip with the upper surface flat and with the backing having a curvature concentric with that of the journal, so that the rubber diminishes in thickness toward the edges.

FIG. 7 shows a bearing strip intended for mounting in a cylindrical supporting shell and therefore having the rigid backing 48 shaped with its back surface 49 having a cylindrical curvature approximately concentric with the journal. In this instance, the rigid backing 48 is of uniform thickness from one edge of the other and the working surface 46 of the rubber layer 45 is flat, which means that the interface 47 is also concentric with the bearing shell and with the journal, and the rubber layer 45 is thinner at the edges rather than thicker as in FIGS. 4 and 5.

Figure 8:
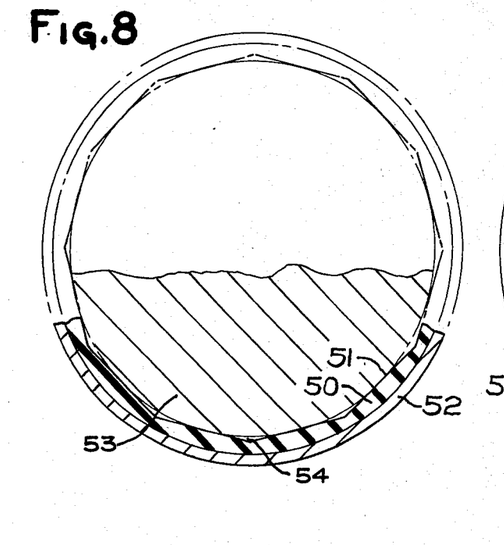
FIG. 8 is a transverse section on a smaller scale of a unitary bearing having a rubber internal surface of twelve longitudinal faces and with the rubber bonded to a cylindrical supporting shell.
Figure 9:
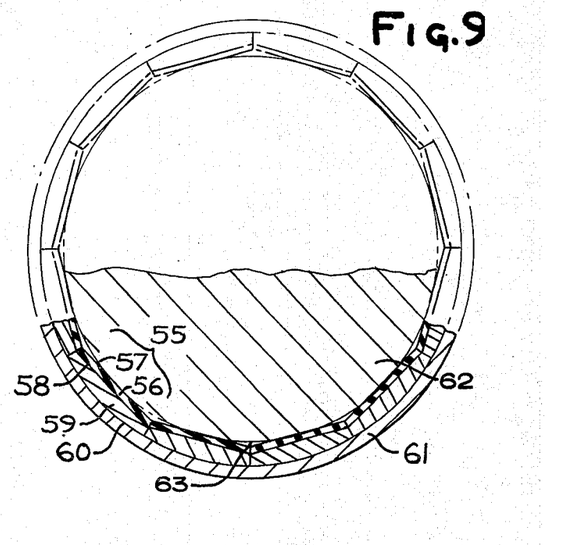
FIG. 9 is a transverse section of a bearing similar to that of FIG. 8 except that the rubber bearing surface is formed in twelve separately prepared strips each having a rigid backing, with the assembly of strips press fitted into the cylindrical supporting shell.

Other forms of the invention, functionally similar to that produced by mounting a plurality of the strips of FIG. 7 in a cylindrical shell, are shown on a smaller scale in FIG. 8 and FIG. 9. In all of these forms, the edges of the rubber strips adjoin one another to produce an internal surface which is polygonal in section, with the corners of the polygons out of contact with the journal so as to provide space for circulation of water for lubrication and cooling.

Specifically, in FIG. 8, showing an end view of a bearing, partly in section, the bearing has an internal layer 50 of rubber with its exposed inner surface 51 having the shape in section of a regular dodecagon, that is, having 12 flat faces. This rubber layer is of a maximum thickness less than one-tenth of the width of any of the twelve faces, and is bonded to a rigid cylindrical shell 52. When a journal 53 is in operating position, the corners of the dodecagon between the rubber layer 50 and the journal 53 constitute lubricant passages 54.

The modification shown in FIG. 9, instead of having a one-piece rubber lining bonded to a shell, has bearing strips press-fitted in a cylindrical shell. The strips in this instance are generally designated as 55 and are 12 in number so that the inner surface, like that of FIG. 8, is in section a regular dodecagon. Each strip 55 has a rubber layer 56 with a flat face 57 and a flat interface 58 with a rigid backing 59 which has a cylindrical outer surface 60 to fit in cylindrical shell 61. Again the spaces at the corners of the dodecagon between the rubber faces 57 and the journal 62 constitute lubricant passages 63. In this case the rubber layer is of a uniform thickness, and the width of each of the twelve faces is at least 12 times the thickness. In this construction, it will often be desirable to use conventional fasteners such as screws or clips (not shown) to facilitate assembly and to eliminate any possibility of displacement of the strips under the relatively high circumferential frictional forces at the moment of commencement of rotation.

Figure 16:
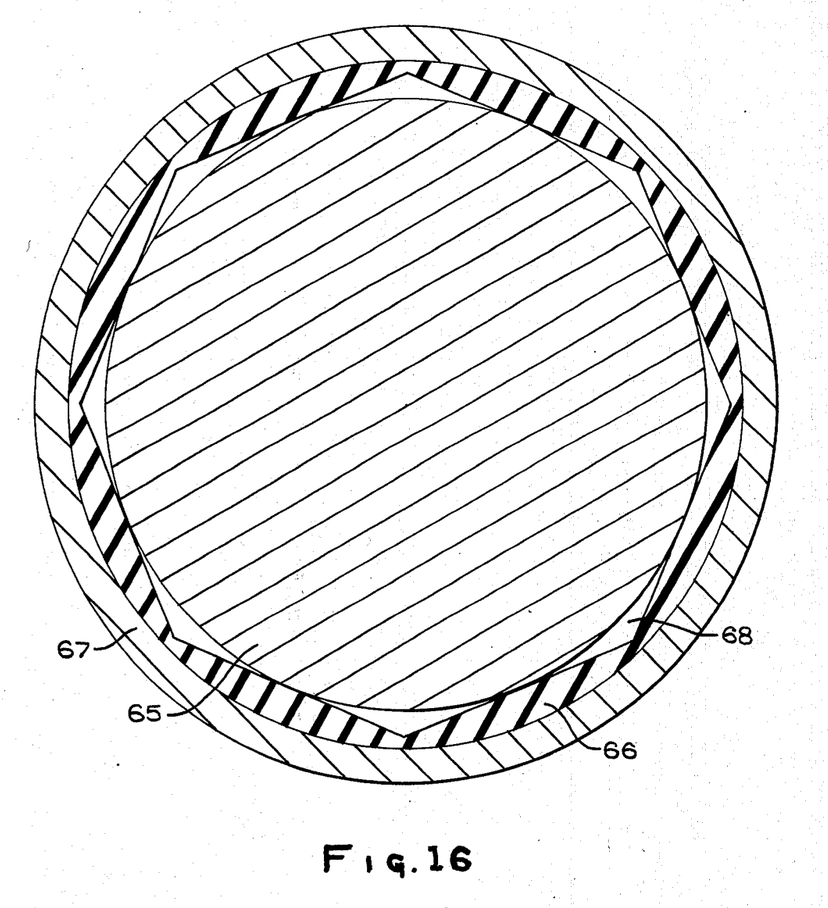
FIG. 16 is a transverse section, in essentially full size, of a unitary bearing like that of FIG. 8 except that the bearing surface consists of only eight longitudinal faces.

The section of a shaft and bearing shown in full size in FIG. 16 has a rubber bearing 66 in a shell 67 with eight faces for supporting the journal 65. The smaller number of faces of the bearing, compared to those of FIG. 8 and FIG. 9 leaves proportionally greater lubricant passages 68 than the bearing with twelve faces shown in FIG. 8.

Bearings having the working surfaces on longitudinal strips which are individually manaufactured are often preferable to integral bearings, especially in large sizes intended for the propeller shafts of large ships, since the total cost of bearings in such large sizes is substantial; and in the case of localized damage or wear, removal and replacement of individual strips can be accomplished at a fraction of the cost of complete replacement.

In the case of bearings of polygonal internal section, as shown in FIG. 8 and FIG. 9, the water channels are limited to the rather narrow corner spaces. In addition, it is sometimes found to be inconvenient to make arrangements for support and manipulation of the segments while they are pressed longitudinally into position, and also inconvenient to make suitable provision (as by inserting screws in drilled and tapped holes through the outside of the supporting shell into the rigid backing strips) to prevent rotational displacement during startup or under unusual conditions of operation. Accordingly, it is sometimes preferred to machine grooves inside of the supporting shell, as indicated in FIG. 3, or, alternatively, to fasten spacer strips in the shell to hold one or a group of bearing strips. Such positive holding arrangements may have the incidental advantage of providing water circulation channels of greater dimension and therefore of removing frictional heat more effectively so as to minimize the likelihood of injury to the bearing surfaces during startup or other low speed operations.

The materials used in manufacture of the bearings of this invention may be the same materials which have been used in making bearings of previous constructions, that is, the actual bearing surface may be made of rubber or any other elastomer having adequate physical properties, together with any rigid backing material to which the surface layer can be bonded satisfactorily). Excellent results have been obtained with conventional carbon-black reinforced vulcanized nitrile rubber compositions having a hardness on the Durometer A scale of about 60 to 80. However, essentially similar results are obtainable with natural rubber or various other kinds of synthetic elastomers, provided that they exhibit a satisfactorily low coefficient of friction when lubricated by water, in the case of water-lubricated bearings, or of the operating fluid, in the case of lubrication by materials other than water, and are not damaged by the operating fluid, and provided they have the necessary high strength and heat resistance to withstand the relatively high momentary forces and intense heating of startup until the lubricating fluid is effectively transported across the bearing surface. Themoplastic elastomers are not presently preferred since they appear to be more susceptible to damage during startup and low speed operations than the vulcanized rubbers.

It has been observed that different benefits are obtained with different degrees of firmness of the vulcanized rubber. Relatively soft grades in the general range of 60 to 75 Durometer A appear to be most resistant to wear caused by presence of suspended grit, and also to produce the lowest values of coefficient of friction ranging down to about 0.001 under the most favorable conditions of moderate loads and moderately high surface speeds such as are encountered in normal operation of large ocean-going ships. Even on startup after a brief stop, the coefficient of friction is as low as 0.05.

On the other hand, the firmer grades in the general range of Durometer A 75 to 85 can support heavier loads without damage for given dimensions, provided that the rubber is so compounded as to exhibit a high strength and resiliency. But static and low speed coefficient of friction values are not as low as with the softer rubber.

It is essential for any high load service that the rubber bearing material be supported by a rigid backing and that it be firmly bonded to the backing. The stresses on heavily loaded thin bearings can be quite high in the midportion of the supporting area of the bearing strips, and impose similar high stresses on the backing material. Consequently, the rigid backing should be made of a material which is not affected by the lubricating fluid, and which has sufficient strength to resist the forces to which it may be subjected.

In the case of water-submerged bearings, noncorroding metals such as brass or stainless steel are quite suitable but are expensive and heavy. Various rigid plastics are also suitable and, when suitably chosen, are less likely to be adversely affected by submersion.

A particularly suitable material for the rigid backing has been found to be high molecular weight polyethylene, and particularly the commercial grade known as ultrahigh molecular weight polyethylene. It is inexpensive and will not undergo significant deformation at the stresses to which it may be subjected in bearing service. It is easily molded or machined to almost any desired shape, and the rubber bearing layer can easily be bonded to this material. In fact, some grades of polyethylene will bond spontaneously to suitably compounded rubber when the rubber is vulcanized, but it is preferred to use cross linking agents to assure a bond at the interface between the vulcanized rubber surface layer and the rigid backing of high molecular weight polyethylene.

A particularly suitable bonding material is methylene bis p-phenyl diisocyanate, which is commercially available as a 50% solution in monochlorobenzene. Such a material can be painted on a vulcanizable nitrile rubber surface and when the polyethylene is applied to it and the assembly is pressed together at vulcanizing temperature a very strong bond results during vulcanization of the rubber. Other equivalent cross linking agents, such as any of the numerous organic peroxide or peroxygen compounds which are being offered for this purpose can be used.

It is sometimes advantageous to mix the polyethylene, or other plastic, with an inert filler, which not only reduces materials cost but also enhances strength and rigidity, and reduces molding time because of increased heat conductivity.

A specific sequence of operations for manufacture of bearing strips is illustrated in FIGS. 10 to 15 in which a thin layer of rubber and a thicker layer of high molecular weight polyethylene are suitably laminated. Although such a laminate can be made from preformed sheets, it is generally simpler to supply at least the backing in powdered or granular form.

Figure 10:
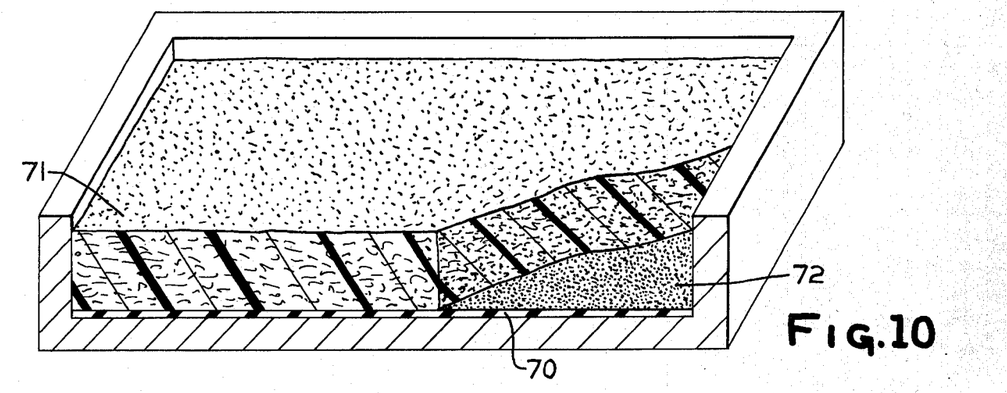
FIG. 10 is a perspective view on a small scale of the assembly of two different materials from which laminated bearing strips of this invention can be fabricated.

As shown in FIG. 10, the chosen unvulcanized rubber composition, such as nitrile rubber (unvulcanized butadieneacrylonitrile copolymer) reinforced with enough carbon black for a vulcanized Durometer A value of 75 and containing sulfur and conventional accelerators for vulcanization, is calendered in the desired thickness and trimmed to fit accurately in the cavity of a rectangular plunger-type mold of suitable size which may be up to 1 or 2 meters in width and length (approximately 3 to 6 feet) or larger if a suitable molding press is available. The unvulcanized rubber sheet 70 may be 2, 3, 4, 5, or 6 millimeters thick (about one-tenth to one-fourth inch) depending on the width of the final strips. After cleaning by wiping with a volatile solvent, a uniform coat 72 of 50% solution of methylene bis p-phenyl diisocyanate is brushed on the exposed surface of the rubber sheet 70.

Figure 11:
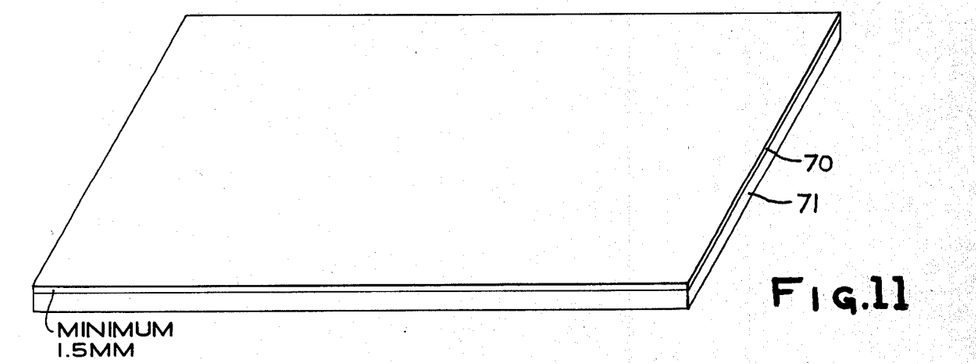
FIG. 11 is a view similar to FIG. 10 showing the two materials bonded to form a laminate.

The required quantity of powdered ultrahigh molecular weight polyethylene 71 to produce a backing of about 25 millimeter thickness (1 inch) is then spread uniformly over the rubber and the plunger is slowly lowered to close the mold. Maximum pressure is applied to the plunger for one or two minutes to drive out air from the powdered plastic. The pressure is then maintained at a lower value while the mold is heated for 30 minutes at 177° C (about 350° F) for vulcanization of the sheet of rubber 70. The pressure is then increased to maximum value for an hour or more for fusion and consolidation of the polyethylene into a firm, impervious backing layer. After cooling of the mold under pressure, the composite sheet is removed, and the two layers 70 and 71 are found to be firmly bonded together.

Figure 12:
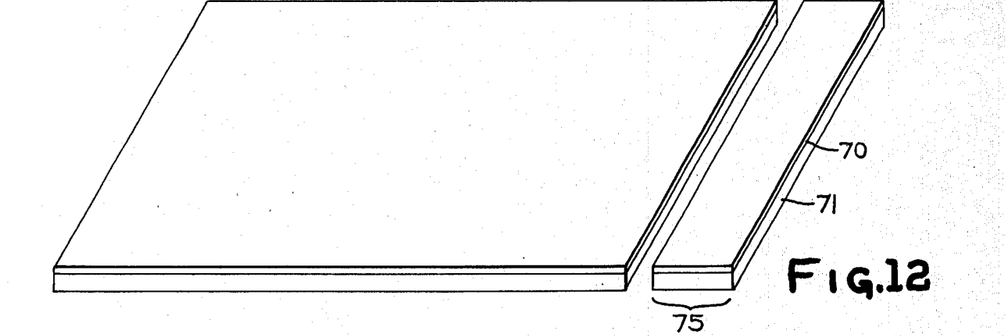
FIG. 12 is another similar view showing a strip cut from one edge of the laminate.
Figure 13:
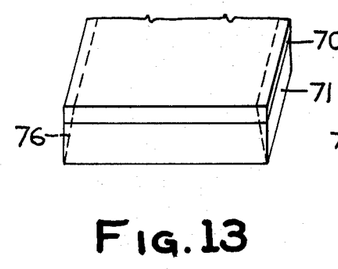
FIG. 13 is a view on a larger scale showing the removal of material to form dovetail edges on the strip.

For manufacture of a bearing strip, a strip 75 of suitable width, as shown in FIG. 12, is severed from the sheet by suitable means, such as a band saw. If the strip is to be mounted in a dovetail groove, as shown in FIG. 3, the edges are machined to produce margins of the required taper, indicated by the dash lines 76 in FIG. 13, and on trimming to the proper length the strip will be ready for insertion.

Figure 14:
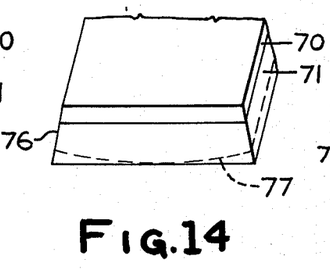
FIG. 14 is a view showing further removal of backing material to produce a cylindrical outer surface.
Figure 15:
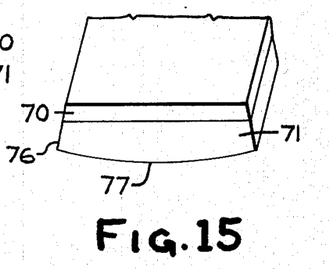
FIG. 15 is a view showing the bearing strip of FIG. 14 in finished form.

On the other hand, if the strip is to be joined to other similar strips by pressing them into a cylindrical shell, as shown in FIG. 9, each strip will not only have the edges machined to the exact width and taper required but will also have the outer surface of the backing 71 machined to the proper curvature 77 to fit in the supporting shell 61 of FIG. 9 and as indicated in the dash lines of FIG. 14. In this instance, the finished bearing strip would have the appearance shown in FIG. 15. If in addition to fitting a plurality of strips into a supporting shell it should be desirable to provide fasteners, suitable provisions such as drilled and tapped holes for screw fasteners, or grooves to receive clips, or recesses to receive spacer bars, or the like, are easily machined in the backing layer 71 with standard machine tools.

In an alternative procedure, the backing material is a mixture of ultrahigh molecular weight polyethylene and an inert filler, preferably fine silica sand, in such proportions (which may be up to about 79% by weight sand and the balance powdered polyethylene) that the spaces between the sand grains are entirely filled by the fused compressed plastic.

Adhesion of the polyethylene powder to the fine silica sand particles if greatly improved if the sand particles are first coated with the diisocyanate adhesion promoter solutions described earlier and then allowed to dry after which the powdered plastic material is then mixed with the coated sand. The much smaller plastic particles coat each sand particle with a very even layer, because of the slightly tacky surface of the coated sand particle and the electrostatic properties of the plastic powder.

In this procedure, the mixed plastic and filler can simply replace the pure plastic. However, it is presently preferred to distribute a thin layer of pure powdered plastic over the unvulcanized rubber coated with bonding material, and then pour in a quantity of the mixture of filler and plastic sufficient to produce the desired total thickness. Both heating and cooling times can then be reduced by one half or more.

It is found that such a thermoplastic backing containing an inert mineral filler greatly increases both strength and rigidity of the backing over values obtained without filler, and in addition reduces warpage of the molded product after its removal from the mold. Surprisingly, the backing containing such a filler, despite its predominantly mineral content, can be easily and precisely cut and machined with conventional machine tools.

I claim:

1. A journal bearing having a plurality of journal-supporting longitudinal faces of elastomeric material separated by longitudinal lubricant passages, with the elastomeric material attached to an essentially rigid external backing, characterized in that each journal-supporting face has:
   a. a surface shape between the limits of the curvature of the journal and a plane, and for a major part of its width has a radius of curvature substantially greater than the radius of the journal;
   b. a circumferential width which is at most half of the diameter of the journal; and
   c. a thickness, between the journal-supporting surface and the rigid external backing, which is at most one-sixth of the width of the face.

2. A journal bearing as in claim 1 in which the number of faces is at least eight.

3. A journal bearing as in claim 1 in which the number of faces is at least twelve.

4. A journal bearing as in claim 1 in which the faces are essentially flat.

5. A journal bearing as in claim 1 in which the faces are tranversely curved with a radius of curvature intermediate between infinity and the radius of the journal.

6. A journal bearing as in claim 1 in which the faces are transversely curved with a curvature in their centers approximating the curvature of the journal and with the transverse edges essentially flat and tangential to the center.

7. A journal bearing as in claim 1 in which the backing is a nonmetallic noncorrodible plastic.

8. A journal bearing as in claim 7 in which the plastic backing is a thermoplastic.

9. A journal bearing as in claim 8 in which the backing contains an inert mineral filler.

10. A journal bearing as in claim 1 in which the faces are of a vulcanized elastomer.

11. A journal bearing as in claim 10 in which the faces are a nitrile rubber.

12. A journal bearing as in claim 1 in which the elastomeric material is essentially uniform in thickness.

13. A journal bearing as in claim 1 in which the elastomeric material is thinnest in the center.

14. A journal bearing as in claim 1 in which the elastomeric material is thinnest at the transverse edges.

15. A journal bearing as in claim 1 in which the thickness of the faces is at most about 1/10 of their width.

16. A journal bearing as in claim 1 in which the thickness of the faces is at most about 1/20 of their width.

17. A journal bearing as in claim 1 in which the faces are the inwardly turned surfaces of separate strips mounted in a supporting shell.

18. A journal bearing as in claim 17 in which the strips are mechanically held in position in the shell.

19. A journal bearing as in claim 18 in which the strips are held by spacer elements more distant from the bearing axis than the bearing faces to provide lubricant passages.

20. A journal bearing as in claim 18 in which there are at least 12 strips and the thickness of elastomer is at most 1/12 of their width.

21. A journal bearing as in claim 20 in which the backing is a noncorrodible thermoplastic and the faces are of a vulcanized elastomer.

22. A journal bearing as in claim 21 in which the backing contains an inert mineral filler.

* * * * *

UNITED STATES PATENT OFFICE
CERTIFICATE OF CORRECTION

PATENT NO. : 3,993,371
DATED : November 23, 1976
INVENTOR(S) : Roy L. Orndorff, Jr.

It is certified that error appears in the above-identified patent and that said Letters Patent are hereby corrected as shown below:

Column 1, line 31, change "probblems" to ---problems---;
Column 2, line 11, change "grip" to ---grit---; Column 2, line 46, change "conveninet" to ---convenient---;
Column 3, line 11, change "To" to ---The---; Column 3, line 66, change "1/13 to 1/16" to ---1/30 to 1/60---;
Column 4, line 8, second appearance of "supporting" should be deleted; Column 8, line 37, "Themoplastic" should read ---Thermoplastic---.

Signed and Sealed this

Eighth Day of March 1977

[SEAL]

Attest:

RUTH C. MASON
Attesting Officer

C. MARSHALL DANN
Commissioner of Patents and Trademarks